United States Patent
Janky et al.

(10) Patent No.: US 6,795,410 B1
(45) Date of Patent: Sep. 21, 2004

(54) SLOW HOPPING DATA TRANSMITTER

(75) Inventors: James M. Janky, Los Altos, CA (US); Arthur E. Anderson, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/338,463

(22) Filed: Jun. 21, 1999

Related U.S. Application Data

(63) Continuation-in-part of application No. 09/265,492, filed on Mar. 9, 1999, now Pat. No. 6,512,928.

(51) Int. Cl.[7] .................................................. H04Q 7/00
(52) U.S. Cl. ....................................... 370/329; 370/341
(58) Field of Search ................................ 370/341, 437, 370/319, 329, 330, 344, 347, 337, 478, 480, 498; 455/434

(56) References Cited

U.S. PATENT DOCUMENTS

| | | | | |
|---|---|---|---|---|
| 4,747,101 A | * | 5/1988 | Akaiwa et al. ............. | 370/329 |
| 5,471,645 A | * | 11/1995 | Felix .......................... | 455/516 |
| 5,765,112 A | * | 6/1998 | Fitzgerald et al. .......... | 455/509 |
| 6,047,175 A | * | 4/2000 | Trompower ................. | 455/422 |
| 6,052,594 A | * | 4/2000 | Chuang et al. ............. | 455/450 |
| 6,112,098 A | * | 8/2000 | Flint et al. .................. | 455/464 |
| 6,400,949 B1 | * | 6/2002 | Bielefeld et al. ........... | 455/434 |
| 6,512,928 B1 | * | 1/2003 | Janky et al. ............. | 455/456.6 |

* cited by examiner

*Primary Examiner*—Chau Nguyen
*Assistant Examiner*—Soon-Dong Hyun

(57) ABSTRACT

A method and apparatus for coupling data between communication devices in which data is transmitted over unoccupied radio channels. Multiple radio channels are monitored by a first communication device and a radio channel or a sequence of radio channels is assigned that is unoccupied. A message is then transmitted by the first communication device that includes the assigned radio channel or assigned sequence of radio channels. The first communication device then changes the radio channel to the assigned radio channel or the next channel in the assigned sequence of radio channels. The second communication device receives the transmission and also moves to the assigned radio channel or the next channel in the assigned sequence of radio channels. The process is repeated such that transmissions are over unoccupied radio channels. This results in both the first communication device and the second communication device "hopping" from channel to channel for communicating messages.

17 Claims, 12 Drawing Sheets

| 1101 → | CHANNEL NO. | 1 | 2 | 3 | 4 | 5 | 6 | 7 | 8 | 9 | 10 |
|---|---|---|---|---|---|---|---|---|---|---|---|
| 1102 → | OCCUPANCY | .2 | .4 | .1 | .6 | .3 | .5 | .4 | .9 | .6 | .3 |
| 1103 → | COMPLIMENT | .8 | .6 | .9 | .4 | .7 | .5 | .6 | .1 | .4 | .7 |
| 1104 → | AVAILABLE? | YES | YES | YES | NO | YES | NO | YES | NO | NO | YES |

FIG. 11

SLOW HOPPING DATA TRANSMITTER

RELATED US APPLICATIONS

This patent application is a continuation-in-part of, and claims priority to, U.S. application Ser. No. 09/265,492, filed Mar. 9, 1999, which issued as U.S. Pat. No. 6,512,928 on Jan. 28, 2003.

TECHNICAL FIELD

This invention relates to communication systems. Specifically, the present invention relates to an apparatus and method for coupling data between communication devices.

BACKGROUND ART

Radio communication is widely used for coupling data between electronic devices. Typically, coupling of data between electronic devices includes transmission of "packets" of digital data. Examples of devices that communicate via radio for coupling data include surveying applications, precision farming applications, etc.

In recent years, the number of persons using licensed and unlicensed frequency bands for voice communications has increased dramatically, making these frequency bands crowded, congested and unavailable for use by users that transmit digital data. Also, persons using licensed and unlicensed frequency bands for voice communications tend to communicate during business hours and during certain times of the day. At these times, desirable frequency bands become highly congested, particularly in densely populated areas, making usage for transmission of digital data difficult if not impossible.

There are many distinct radio bands available to users that transmit digital data, starting at 30–50 MHz and extending into the VHF range (220 MHz to 450–470 MHz, and 900 MHz). All available frequency bands with the exception of the 900 MHz band require a license from the Federal Communications Commission (FCC) for permission to operate, and such operation is covered by Part 90 of the FCC rules and regulations. The 450–470 MHz band is authorized for primary use by occasional voice service, on a shared use basis with others in a particular service area. Typical users include taxi dispatch, maintenance and repair dispatch, and other business or government services that need occasional voice service and do not need access to a nationwide telecommunications service.

Most users of available communication channels are required to share the channel with other users. However, users that transmit data such as surveyors typically set up on a work site and start transmitting data packets, that are typically broadcast once per second, with a duration of approximately 0.25–0.4 seconds, until the project is complete. Thus, a particular channel is virtually occupied by the transient user until the project is complete. This can create problems for other users, particularly when a radio channel is used for which there is a local area repeater system. If the data packets are picked up by the repeater system, they are rebroadcast over a much larger area. This renders the particular channel completely useless over a large area. Even if the user's signal is not repeated, the user's strong signal may "capture" the repeater's receiver and thereby prevent voice users from using the repeater.

For the above reasons, a channel formerly used by local voice users can become unusable for the entire time period in which data is transmitted. When an established user, at his base of operations, cannot access the user's mobile fleet in a few seconds, his options are few: wait until the channel clears, or reassign each radio in the fleet to a new channel. This is inconvenient and time consuming for the established user. This also can lead to complaints by the local established users to the FCC for failure to abide by the rules of operation established by the FCC that call for "sharing" the channel.

The FCC requires that voice users listen before they speak to assure that the channel is available. However, in many instances users do not listen for a sufficient amount of time. This often results in voice users talking over a digital data transmitter's transmission. This can result in loss of data. If the voice usage is significant, this may force the user of the digital data transmitter to change to a less congested frequency band.

What is needed is a method and apparatus that will allow for more efficient use of available frequency bands. Also, a method and apparatus is needed that meets the above needs and that does not interfere with voice communication. In addition, a method and apparatus is needed that meets the above needs and that is inexpensive and easy to operate.

DISCLOSURE OF THE INVENTION

The present invention provides an apparatus and method that allows for more efficient use of available frequency bands. The method and apparatus of the present invention provide for coupling data from a first communication device to a second communication device that transmits over unoccupied radio channels. More particularly, the present invention provides a method and apparatus that is inexpensive and easy to operate and that minimizes interference with voice communication.

A first communication device and a second communication device are disclosed that couple data via radio. In one embodiment, the radio is adapted to transmit over unlicensed frequency bands. However, alternatively, licensed bands could be used also.

In operation, the communication device that is sending data, designated as a first communication device, monitors multiple radio channels and generates a channel occupancy map that indicates the occupancy of the monitored channels. A channel selection algorithm is then used for determining available channel(s) and assigning one channel, or a sequence of channels for subsequent communications. In one embodiment, user defined channel preference factors are used in the channel selection algorithm for determining assigned channel(s).

A message is then generated that includes data to be transmitted and that indicates the assigned radio channel(s). The message is transmitted to the second communication device. The first communication device then changes the radio channel to the assigned radio channel or the next radio channel in the assigned sequence of radio channels. The first communication device continues to monitor channel occupancy using subsequently generated channel occupancy maps and updates the assigned radio channel or sequence of radio channels. Each time the assigned radio channel or sequence of radio channels is updated, the updated assigned radio channel or sequence of radio channels is indicated in a message transmitted by the first communication device.

The second communication device receives each message indicating an assigned channel or sequence of assigned channels and moves to the assigned channel or the next assigned channel in the sequence of assigned channels for receiving the next transmission. Thus, the first communication device and the second communication device move from channel to channel, communicating over unoccupied channels.

The method and apparatus of the present invention allows for communication over multiple channels sequentially by moving from channel to channel. By communicating over unoccupied channels, more efficient use of available frequency bands is obtained. In addition, by communicating over unoccupied channels, the method and apparatus of the present invention does not interfere with voice communication. In addition, the method and apparatus of the present invention is inexpensive and easy to operate.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, that are incorporated in and form a part of this specification, illustrate embodiments of the invention and, together with the description, serve to explain the principles of the invention:

FIG. 11 is a diagram illustrating an exemplary assignment of a radio channel or sequence of radio channels using predicted occupancy in accordance with one embodiment of the present claimed invention.

Figure 1:
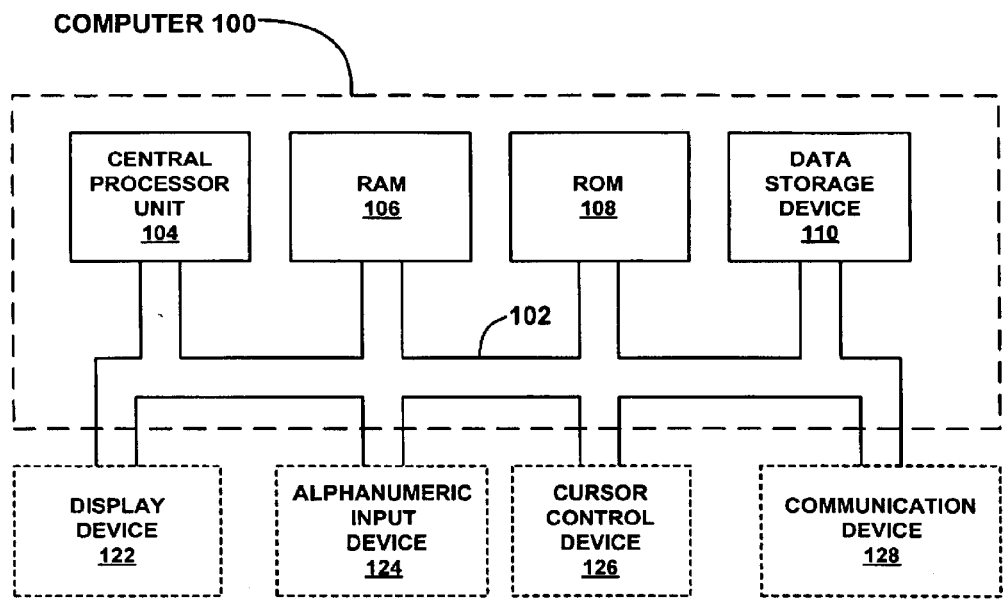
FIG. 1 is a diagram showing an exemplary computer system in accordance with one embodiment of the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "receiving," "sending," "determining," "inserting" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the present method for sending a message that indicates position and system are comprised of computer-readable and computer-executable instructions that reside, for example, in computer-usable media of a computer system. FIG. 1 illustrates an exemplary computer system 100 used to perform the method of coupling a message by radio from a first communication device to a second communication device in accordance with one embodiment of the present invention. It is appreciated that system 100 of FIG. 1 is exemplary only and that the present invention can operate within a number of different computer systems including general purpose networked computer systems, embedded computer systems, and stand-alone computer systems. Additionally, computer system 100 of FIG. 1 is well adapted having computer readable media such as, for example, a floppy disk, a compact disc, and the like coupled thereto. Such computer readable media is not shown coupled to computer system 100 in FIG. 1 for purposes of clarity.

System 100 of FIG. 1 includes an address/data bus 102 for communicating information, and a central processor unit 104 coupled to bus 102 for processing information and instructions. System 100 also includes data storage features such as a computer usable volatile memory 106, e.g. random access memory (RAM), coupled to bus 102 for storing information and instructions for central processor unit 104, computer usable non-volatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 124 including alphanumeric and function keys is coupled to bus 102 for communicating information and command selections to central processor unit 104. System 100 also optionally includes a cursor control device 126 coupled to bus 102 for communicating user input information and command selections to central processor unit 104. System 100 of the present embodiment also includes an optional display device 122 coupled to bus 102 for displaying information.

Referring still to FIG. 1, optional display device 122 of FIG. 1, may be a liquid crystal device, cathode ray tube, or other display device suitable for creating graphic images and alphanumeric characters recognizable to a user. Optional cursor control device 126 allows the computer user to dynamically signal the two dimensional movement of a visible symbol (cursor) on a display screen of display device 122. Many implementations of cursor control device 126 are known in the art including a trackball, mouse, touch pad, joystick or special keys on alphanumeric input device 124 capable of signaling movement of a given direction or manner of displacement. Alternatively, it will be appreciated that a cursor can be directed and/or activated via input from alphanumeric input device 124 using special keys and key sequence commands. The present invention is also well suited to directing a cursor by other means such as, for example, voice commands. A more detailed discussion of the interrupt optimization method and system embodiments of the present invention are found below.

With reference still to FIG. 1, significantly, a communication device 128, coupled to bus 102, is used for transmitting and receiving data. In one embodiment, communication device 128 includes a radio modem. Alternatively, a radio transceiver, a radio transmitter and radio receiver, etc. can be used.

Figure 2:
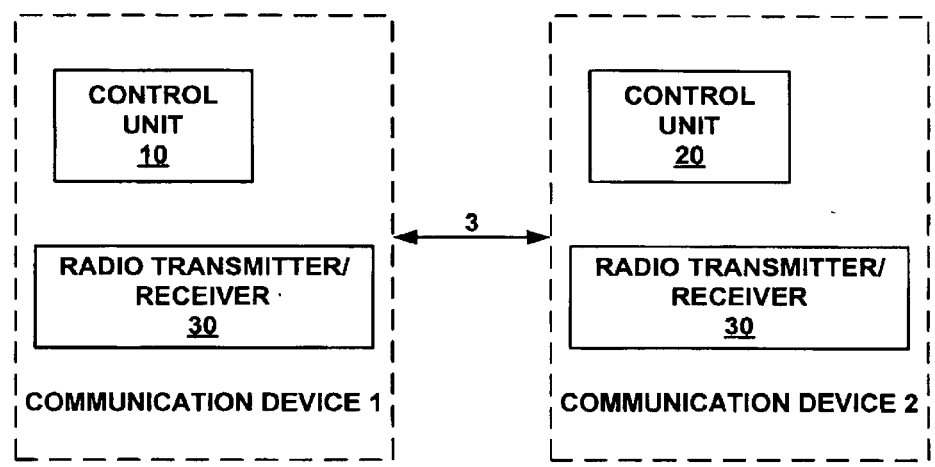
FIG. 2 is a schematic diagram of a system that includes a first communication device and a second communication device in accordance with one embodiment of the present claimed invention.

FIG. 2 shows a communication device 1 that is adapted to communicate with communication device 2. Communication between communication device 1 and communication device 2, indicated by arrow 3, is conducted over licensed or unlicensed radio frequencies.

Communication device 1 of FIG. 2 includes control unit 10 that controls the operations of communication device 1. In one embodiment, control unit 10 is a computer such as computer 100 of FIG. 1. Radio transmitter/receiver 30 of communication device 1 is operable in response to instructions and input from control unit 10 to transmit and receive radio signals.

Communication device 2 of FIG. 2 includes control unit 20 that controls the operations of communication device 2. In one embodiment, control unit 20 is identical to control unit 10 of FIG. 1. Radio transmitter/receiver 3 of communication device 2 is operable in response to instructions and input from control unit 20 to transmit and receive radio signals.

Figure 3:
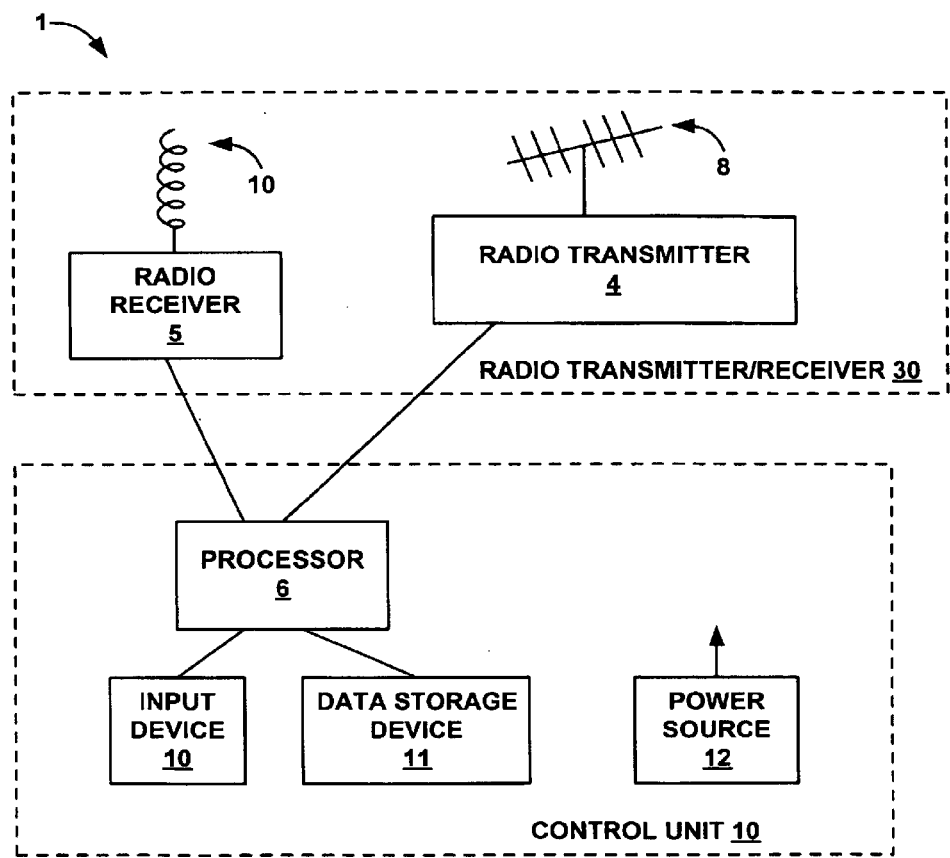
FIG. 3 is a schematic diagram of a first communication device in accordance with one embodiment of the present claimed invention.

FIG. 3 shows an embodiment of communication device 1 in which radio transmitter/receiver 3 includes a separate radio transmitter 4 and radio receiver 5. In one embodiment, radio receiver 5 is a multi-channel scanner that receives radio signals through antenna 10 and radio transmitter 4 transmits radio signals through antenna 8.

Continuing with FIG. 3, in one embodiment, control unit 10 is shown to include a processor 6 that is coupled to radio transmitter 4 and radio receiver 5. In one embodiment, processor 6 is a general-purpose microprocessor that has low power consumption such as, for example, a MIPS R4K microprocessor made by Silicon Graphics Inc., of Mountain View, Calif. In one embodiment, a computer program (not shown) operates on processor 6 for controlling the operations of communication device 1. Alternatively, processor 6 can be an Application Specific Integrated Circuit (ASIC) device or a Field Programmable Gate Array (FPGA) device that is programmed to perform the desired functions.

Data storage device 11 of FIG. 3 is coupled to processor 6 and is adapted to store data. Data storage device 11 may be any type of digital data storage medium. In one embodiment, data storage device 11 is a Random Access Memory (RAM) device such as, for example, a Static Random Access Memory (SRAM) device, a Dynamic Random Access Memory (DRAM) device or a flash memory storage device.

Continuing with FIG. 3, power source 12 provides power to the various components of communication device 1. Power source 12 may be any portable power source. In one embodiment, power source 12 includes D cell batteries.

Still referring to FIG. 3, input device 10 can be any device adapted to couple user input to processor 6. In one embodiment, input device 10 is an alphanumeric keypad that includes one or more function keys. However, alternatively, input device 10 could include a touchpad, joystick, mouse, etc that is usable in combination with a visible display for coupling user input to processor 6.

Although radio transmitter/receiver 3 of FIG. 3 is shown to include a separate radio transmitter and radio receiver, alternatively, radio transmitter/receiver 3 could include a radio transceiver that is adapted to both send and receive radio signals.

Figure 4:
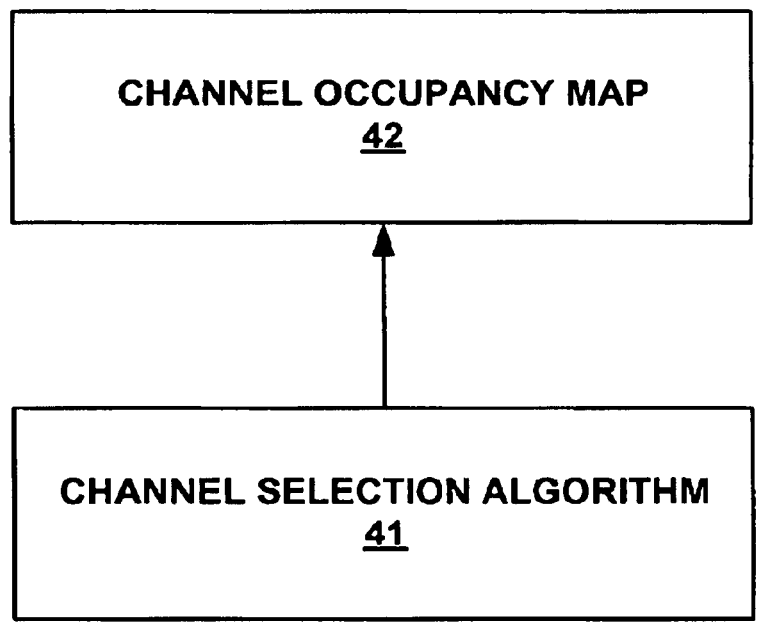
FIG. 4 is a schematic diagram showing a channel occupancy map and a channel selection algorithm in accordance with one embodiment of the present claimed invention.

Referring now to FIG. 4, channel occupancy map 42 indicates the occupancy of radio channels. In one embodiment, channel occupancy map 42 is a data file that is generated by processor 6 of FIG. 3 and that is stored in data storage device 11 of FIG. 3. Alternatively, channel occupancy map 42 can be stored in data storage registers of processor 6. In an embodiment that includes computer 100 of FIG. 1, channel occupancy map 42 is generated by central processing unit 104 and is stored in volatile memory storage (RAM) 106.

Referring still to FIG. 4, a channel selection algorithm 41 is adapted to determine available channel(s) and assign a radio channel or assign a sequence of radio channels. In one embodiment, channel selection algorithm 41 uses data from channel occupancy map 42 for determining whether radio channels are occupied and for assigning radio channel(s). In one embodiment, channel selection algorithm 41 is an algorithm that is adapted to run on processor 6 of FIG. 3 for determining available channels and for assigning channel(s). In one embodiment, channel selection algorithm 41 is a software program that is stored in data storage device 11 of FIG. 3 that is adapted to run on processor 6 of FIG. 3. Alternatively, when processor 6 of FIG. 3 is an ASIC device or a FPGA device, channel selection algorithm 41 is programmed into processor 6. In an embodiment that includes computer 100 of FIG. 1, channel selection algorithm 41 is stored in non-volatile memory storage (ROM) 106 or on data storage device 110 and operates on central processing unit 104.

Figure 5:
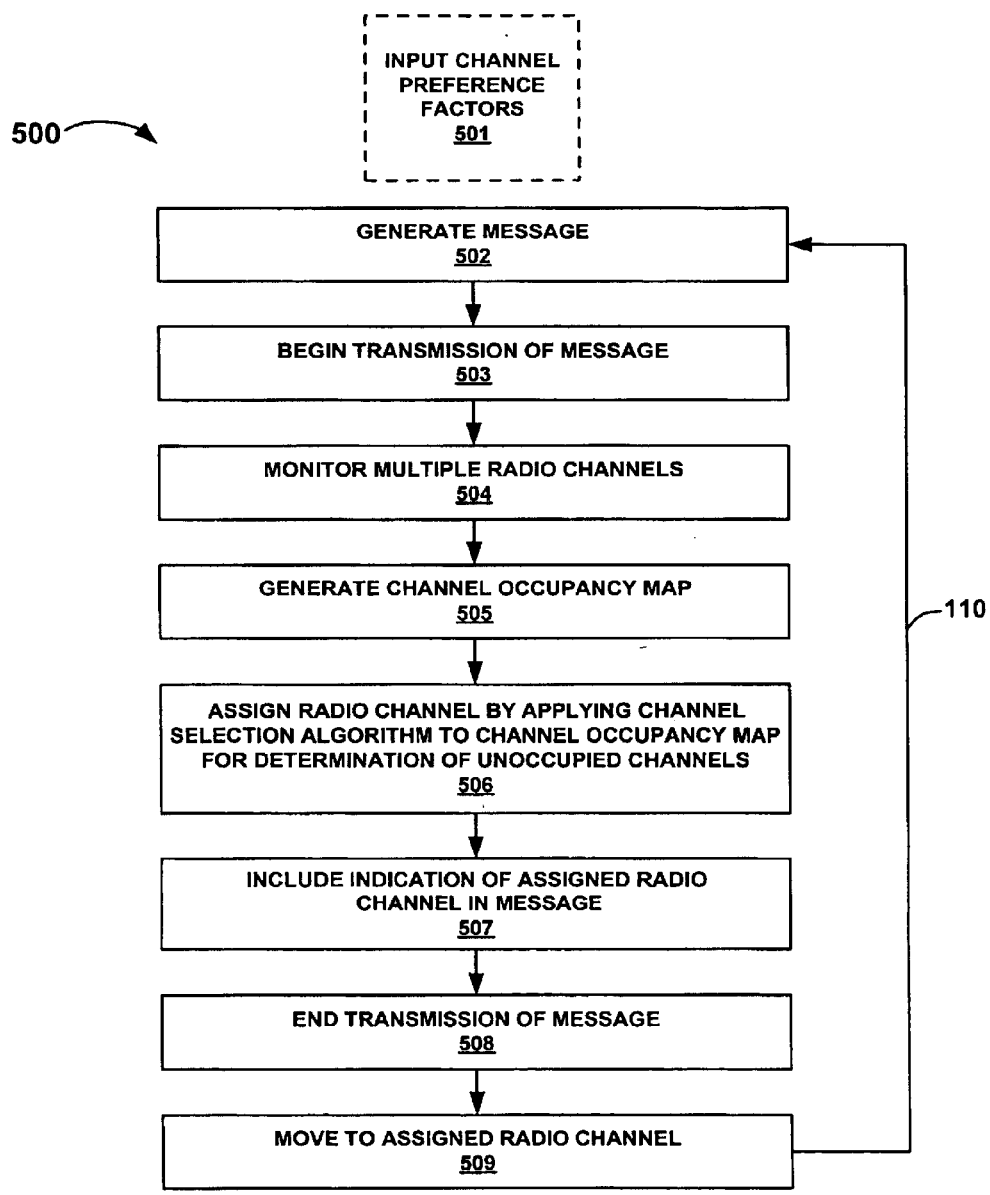
FIG. 5 is a flow chart showing a method for coupling data from a first communication device to a second communication device in accordance with one embodiment of the present claimed invention.

FIG. 5 illustrates a method 500 for coupling a message from a first communication device to a second communication device over unoccupied radio channels. In the foregoing example, communication device 1 of FIG. 1 is described as transmitting messages to communication device 2. However, alternatively, messages may be transmitted from communication device 2 to communication device 1 using the method 500 of FIG. 5.

In one embodiment, channel preference factors can be input as shown by step 501 of FIG. 5. Channel preference factors allow the user to indicate preferred channels and eliminate channels that are not desired. In the embodiment shown in FIG. 3, channel preference factors are input using input device 10.

A message is then generated as shown by step 502 of FIG. 5. In one embodiment, data that is to be transmitted is divided into a message having a predetermined length. In one embodiment, a messages having a length that corresponds to a transmission time of between 0.4 seconds and one second is used.

Continuing with FIG. 5, as shown by step 503, transmission of the message generated in step 502 is initiated. In the embodiment shown in FIG. 1, communication device 128 is used for transmission and in FIG. 2, the message is transmitted by transmitter/receiver 30. In the embodiment shown in FIG. 3, radio transmitter 4 transmits the message via antenna 8.

Continuing with FIG. 5, during the transmission of the message generated in step 502, steps 504–507 are performed.

Continuing with FIG. 5, multiple radio channels are monitored as shown by step 504. In the embodiment shown in FIG. 2, radio transmitter/receiver 30 monitors multiple radio channels and couples radio traffic received over monitored radio channels to control unit 10 of communication device 1. In the embodiment shown in FIG. 3, radio receiver 5 is operable to monitor radio channels and couple radio traffic to processor 6.

A channel occupancy map is generated as shown by step 505. In the embodiment shown in FIGS. 3–4, channel occupancy map 42 is generated using transmissions received by radio receiver 5. The channel occupancy map 42 indicates the occupancy of monitored radio channels.

Figure 10:
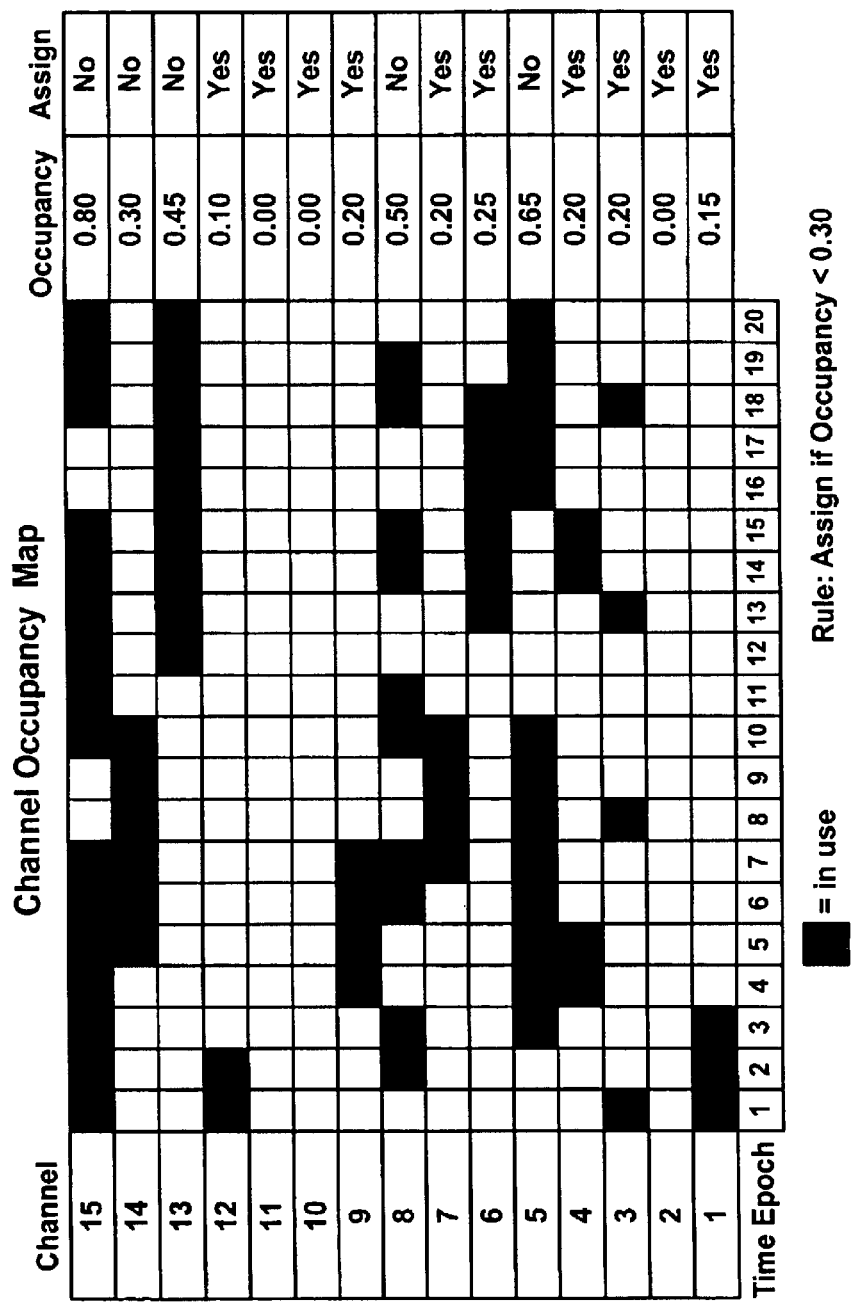
FIG. 10 is a diagram illustrating an exemplary channel occupancy map in accordance with one embodiment of the present claimed invention.

FIG. 10 shows an exemplary channel occupancy map that reflects the occupancy of channels 1–15 over a 20 second time epoch. The occupancy, expressed as a percentage for each of channels 1–15 is indicated. For example, channel 15 was determined to be occupied 80 percent of the time. In contrast, channels 2, 10, and 11 have an occupancy of zero percent as a result of no communications being detected during any of the monitored time epochs.

Continuing with FIG. 5, as shown by step 506, the channel selection algorithm is applied to the channel occupancy map for determination of unoccupied channels and the assignment of a radio channel. In one embodiment, the channel selection algorithm uses a threshold value for determining whether or not a particular channel is occupied. If the occupancy of a particular channel is less than the threshold value, the channel is determined to be unoccupied.

Referring now to the channel occupancy map of FIG. 10, an exemplary determination of occupancy is shown under the column marked assign. In this example, the threshold value is 30 percent. Thus, those channels that have an occupancy of less than 30 percent are determined to be unoccupied. In this example, channels 1, 2, 3, 4, 6, 7, 9, 10, 11 and 12 are determined to be unoccupied.

Continuing with step 506 of FIG. 5, once a determination is made as to the channels that are unoccupied, a radio channel is assigned from the available unoccupied radio channels. In one embodiment, the first radio channel that is determined to be unoccupied is assigned. Alternatively, when a channel preference factor indicates a preferred channel or channels, the first unoccupied preferred channel is selected.

Referring now to step 507 of FIG. 5, an indication of the assigned radio channel is included in the message. In one embodiment, the indication of the assigned radio channel is simply the number of the channel. The number of the channel is included by appending the number of the channel to the end of the message.

Step 508 shows the end of the transmission of the message. After message transmission is completed as shown by step 508, the radio channel is changed to the assigned radio channel. That is, the radio channel is changed to the radio channel assigned in step 506. In the embodiment shown in FIG. 3, processor 6 instructs radio transmitter/receiver 30 to move to the assigned radio channel.

As shown by arrow 110, the process of steps 502–509 is repeated until all of the data has been transmitted. That is, a new message is generated containing the data to be transmitted as shown by step 502 and transmission of the message is initiated as shown by step 503. During the transmission of the message, multiple radio channels are monitored as shown by step 504 and a new channel occupancy map is generated as shown by step 505. The channel selection algorithm is applied to the new channel occupancy map for determining channels that are unoccupied and assigning a radio channel. An indication of the assigned radio channel is then included in the message as shown by step 507. After the transmission of the message is complete, as shown by step 508, the radio channel for message transmission is changed to the newly assigned radio channel. This results in a process in which the transmitter moves or "hops" from channel to channel.

Figure 6:
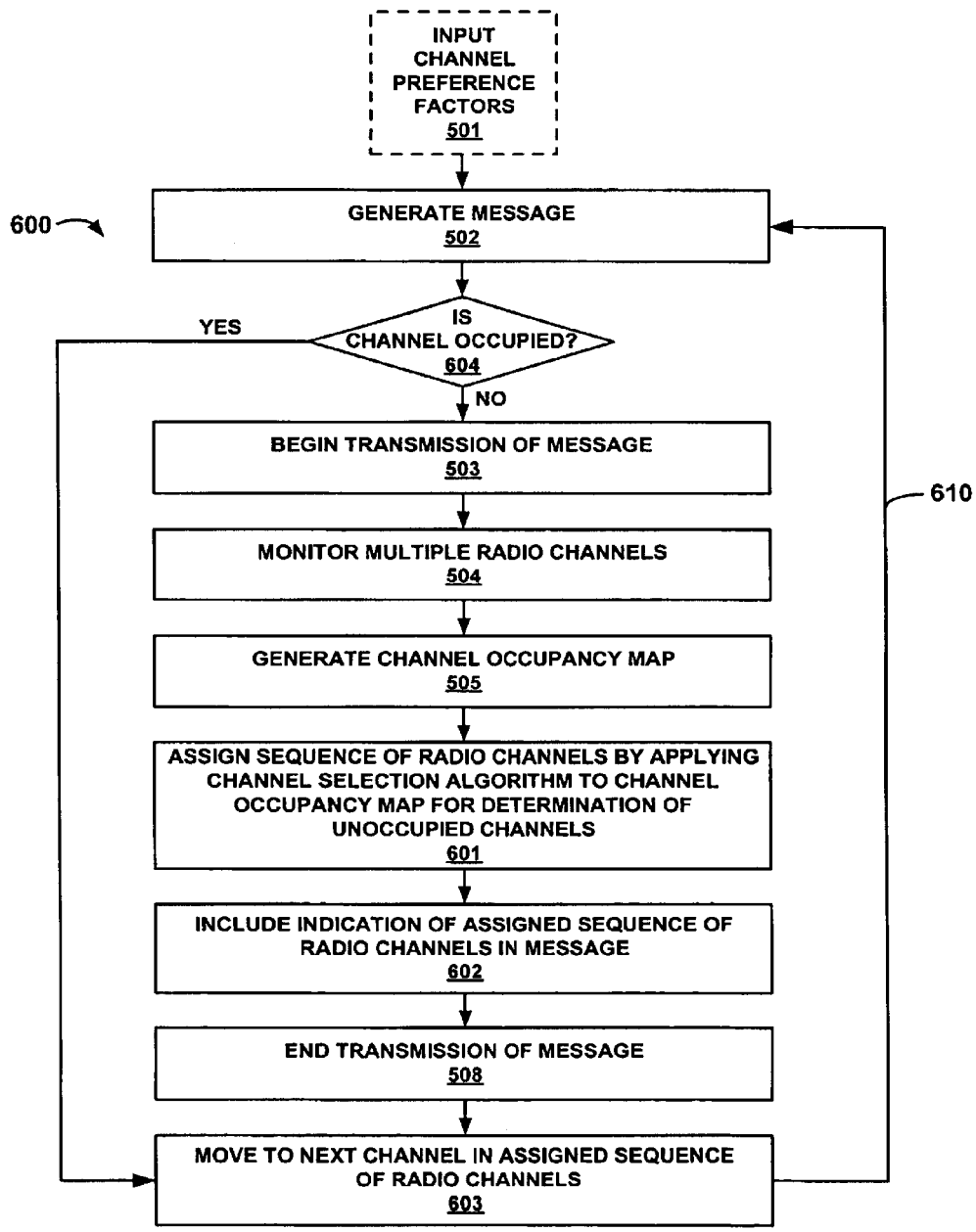
FIG. 6 is a flow chart showing a method for coupling data from a first communication device to a second communication device that includes the assignment of multiple radio channels in accordance with one embodiment of the present claimed invention.

In an alternate embodiment that is shown in flow chart 600 of FIG. 6, multiple radio channels are assigned. First, a message is generated as shown by step 502 of FIG. 6.

In one embodiment, a "last second" listen test is used to assure that all transmissions are over radio channels that are currently not in use. In this embodiment, if channel activity is detected immediately prior to step 503, the scheduled transmission is aborted as shown by optional step 604.

As shown by step 503, transmission of the message generated in step 502 is initiated. In the embodiment shown in FIG. 2, the message is transmitted by transmitter/receiver 30. In the embodiment shown in FIG. 3, radio transmitter 4 transmits the message via antenna 8.

Continuing with FIG. 6, during the transmission of the message generated in step 502, steps 503–505 and 601–602 are performed. First, multiple radio channels are monitored as shown by step 504 and a channel occupancy map is generated as shown by step 505.

As shown by step 601, a channel selection algorithm is applied to the channel occupancy map for determination of unoccupied radio channels. In one embodiment, the channel selection algorithm uses a threshold value for determining whether or not a particular channel is occupied. If the occupancy of a particular channel is less than the threshold value, the channel is determined to be unoccupied.

Continuing with step 601 of FIG. 6, once a determination is made as to the channels that are unoccupied, a sequence of radio channels are assigned from the available unoccupied radio channels. In one embodiment, the first N radio channels that are determined to be unoccupied are assigned, with N being the number of radio channels in the assigned sequence of radio channels.

Referring now to step 602 of FIG. 6, an indication of the assigned radio channel is included in the message. In one embodiment, the indication of the assigned sequence of radio channels is simply a series of numbers that are appended to the end of the message.

Step 508 shows the end of the transmission of the message. After message transmission is completed, the radio channel is changed to the next radio channel in the assigned sequence of radio channels as shown by step 603.

As shown by arrow 610, the process of steps 502–505, 508 and 601–604 is repeated until all of the data has been transmitted. That is, a new message is generated as shown by step 502 and transmission of the message is initiated as shown by step 503. During the transmission of the message, multiple radio channels are monitored as shown by step 504 and a new channel occupancy map is generated as shown by step 505. As shown by step 601, the channel selection algorithm is applied to the channel occupancy map for determining channels that are unoccupied and a sequence of radio channels are assigned. As shown by step 602, an indication of the assigned sequence of radio channels is then included in the message. After the transmission of the message is complete, the process moves or "hops" to the next radio channel in the assigned sequence of radio channels as shown by step 603.

In one embodiment, a sequence of 30 radio channels is assigned with each message transmitted according to the previously assigned sequence of radio channels. In one embodiment, 30 radio channels are assigned for each thirty second time period and transmissions are initiated at the beginning of each second. This gives a series of 30 radio channels for each thirty-second time period, with one channel assigned to each second.

Figure 7:
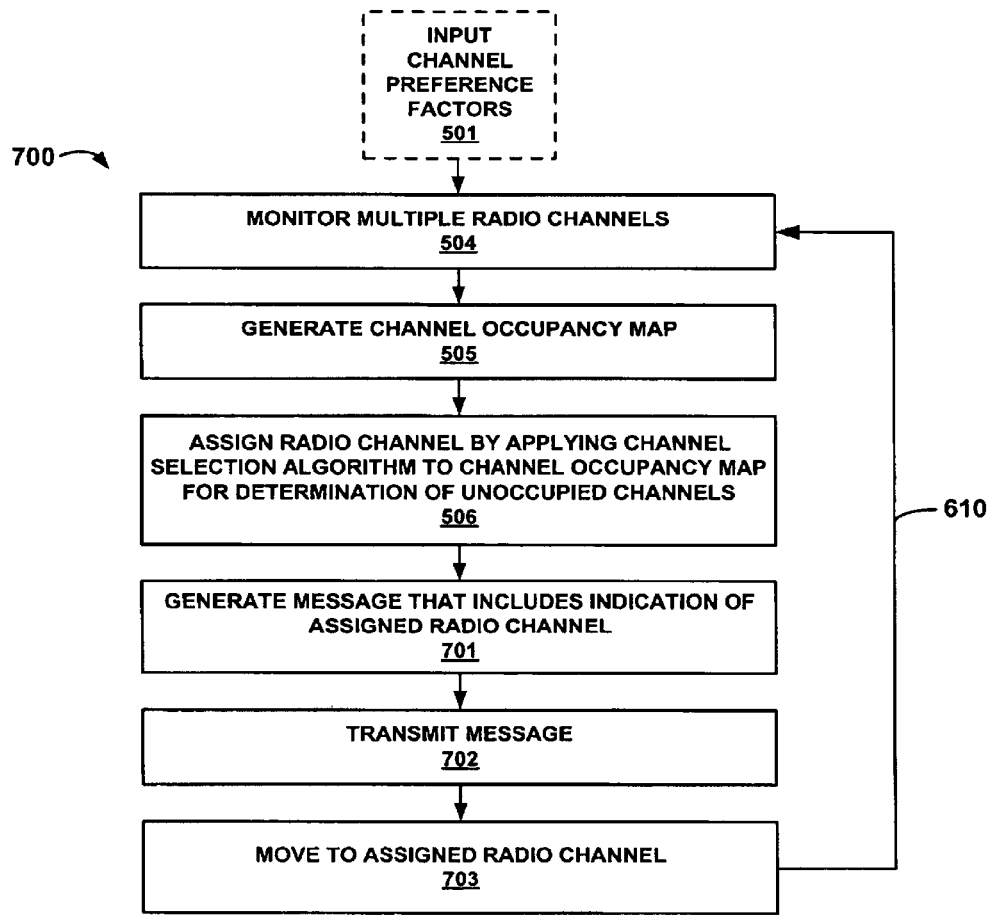
FIG. 7 is a flow chart showing a method for coupling data from a first communication device to a second communication device in accordance with one embodiment of the present claimed invention.
Figure 8:
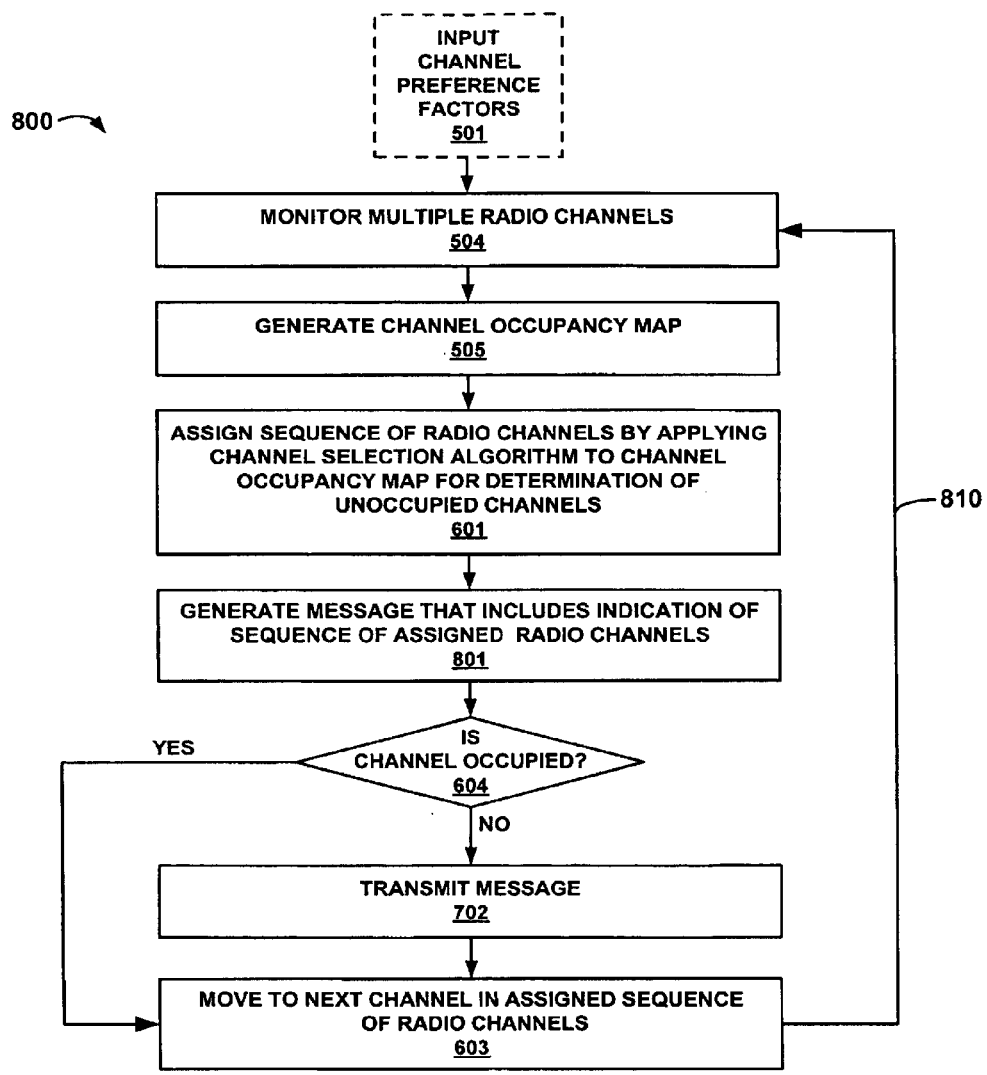
FIG. 8 is a flow chart showing a method for coupling data from a first communication device to a second communication device that includes the assignment of multiple radio channels in accordance with one embodiment of the present claimed invention.

In an alternate embodiment that is shown in FIGS. 7–8, the assigned radio channel or sequence of radio channels is updated between transmissions of messages. That is, messages are transmitted at intervals, with a time delay between subsequent transmissions sufficient for performing steps 504–507.

Referring now to FIG. 7, channel preference factors can be input as shown by optional step 501. Along with channel preference factors, a home channel can be input. Alternatively, a predetermined (default) home channel is used.

Continuing with FIG. 7, multiple radio channels are monitored as shown by step 504, a channel occupancy map is generated as shown by step 505, the channel selection algorithm is applied to the channel occupancy map for determining a channel that is unoccupied and a radio channel is assigned as shown by step 506.

A message is generated as shown by step 701 of FIG. 7 that indicates the assigned radio channel. That is, in one embodiment, the data that is to be transmitted is included in a message that indicates the assigned radio channel. In one embodiment, the indication of the assigned radio channel is the number of the assigned radio channel that is inserted at the end of the message.

The message is then transmitted as shown by step 702. The radio channel is then moved to the assigned radio channel as shown by step 703. More particularly, the radio channel of the transmitter is moved to the assigned radio channel.

Continuing with FIG. 7, the process of steps 504–506 and 701–703 is repeated as shown by arrow 610 until all of the data has been transmitted. That is, multiple radio channels are monitored as shown by step 504 and a new channel occupancy map is generated as shown by step 505. As shown by step 506, the channel selection algorithm is applied to the new channel occupancy map for determining a channel that is unoccupied and assigning a new radio channel. As shown by step 701, a new message is generated that includes an indication of the newly assigned radio channel which is then transmitted as shown by step 702. The transmitter is then moved to the newly assigned radio channel as shown by step 703.

In the embodiment shown in FIG. 8, multiple channels are assigned so as to obtain an assigned sequence of radio channels. As in the previous embodiments, channel preference factors can be input as shown by optional step 501. Along with channel preference factors, a home channel can be input. Alternatively, a predetermined (default) home channel is used.

Continuing with FIG. 8, multiple radio channels are monitored as shown by step 504 and a channel occupancy map is generated as shown by optional step 505. As shown by step 801, the channel selection algorithm is applied to the channel occupancy map for determining channels that are unoccupied and assigning a sequence of radio channels.

A message is generated as shown by step 801 that indicates the assigned radio channel. That is, in one embodiment, the data that is to be transmitted is included in a message that indicates the assigned radio channel. In one embodiment, the indication of the assigned radio channel is the number of the assigned radio channel that is inserted at the end of the message.

In one embodiment, a "last second" listen test is used to assure that all transmissions are over radio channels that are currently not in use. In this embodiment, if channel activity is detected immediately prior to step 702, the scheduled transmission is aborted as shown by optional step 604. Otherwise, the message is transmitted as shown by step 702.

The radio channel is then moved to the assigned radio channel as shown by step 603. More particularly, the radio channel of the transmitter is moved to the to the next radio channel in the assigned sequence of radio channels.

Continuing with FIG. 8, the process of steps 504–505, 601, 603–604, 702 and 801 is repeated as shown by arrow 810 until all of the data has been transmitted. That is, multiple radio channels are monitored as shown by step 504 and a new channel occupancy map is generated as shown by step 505. As shown by step 601, the channel selection algorithm is applied to the channel occupancy for determining channels that are unoccupied and a new sequence of radio channels is assigned. As shown by step 801, a new message is generated that includes an indication of the newly assigned sequence of radio channels. The new message is transmitted as shown by step 702 when the radio channel over which the transmission is to occur is not occupied immediately prior to the transmission as shown by step 604. The transmitter is then moved to the newly assigned radio channel as shown by step 603.

In one embodiment, transmissions shown by step 503 and 508 of FIGS. 5–6 and step 702 of FIGS. 7–8 are synchronized and each transmission begins at the beginning of each second. In one embodiment, the first message is transmitted over a home channel and all subsequent messages are transmitted over an assigned radio channel. Thus, the methods of FIGS. 5–8 generate a series of messages that include an indication of an assigned radio channel or assigned sequence of radio channels. After each message is transmitted, the communication device 1 moves to the next assigned radio channel, "hopping" from channel to channel.

Method 600 of FIG. 6 and Method 800 of FIG. 8 provide for the generation of sequences of assigned radio channels. This allows the receiving communication device to operate independently from the time that a sequence of radio channels is received until such time that a new sequence is transmitted. This method provides for a more reliable link between the sending communication device and the receiving communication device because the failure to receive a single transmission will likely not result in a loss of connection. That is, because a sequence of radio channels is transmitted, updates to the sequence can be obtained by a receiving communication device prior to the "hop" to a new sequence of assigned radio channels. This results in multiple opportunities for communication of updates to the sequence before the sending communication device moves to the newly assigned sequence of channels.

Referring now to FIGS. 6 and 8, the "last second listen test" shown in optional step 604 results in aborted transmissions when channel activity is detected. However, since transmissions are initiated each second, the abortion of a single transmission does not significantly affect the operation of the system. Yet, by monitoring the channel and aborting transmission when radio traffic is detected, the method and apparatus of the present invention does not walk over other radio traffic.

Figure 9:
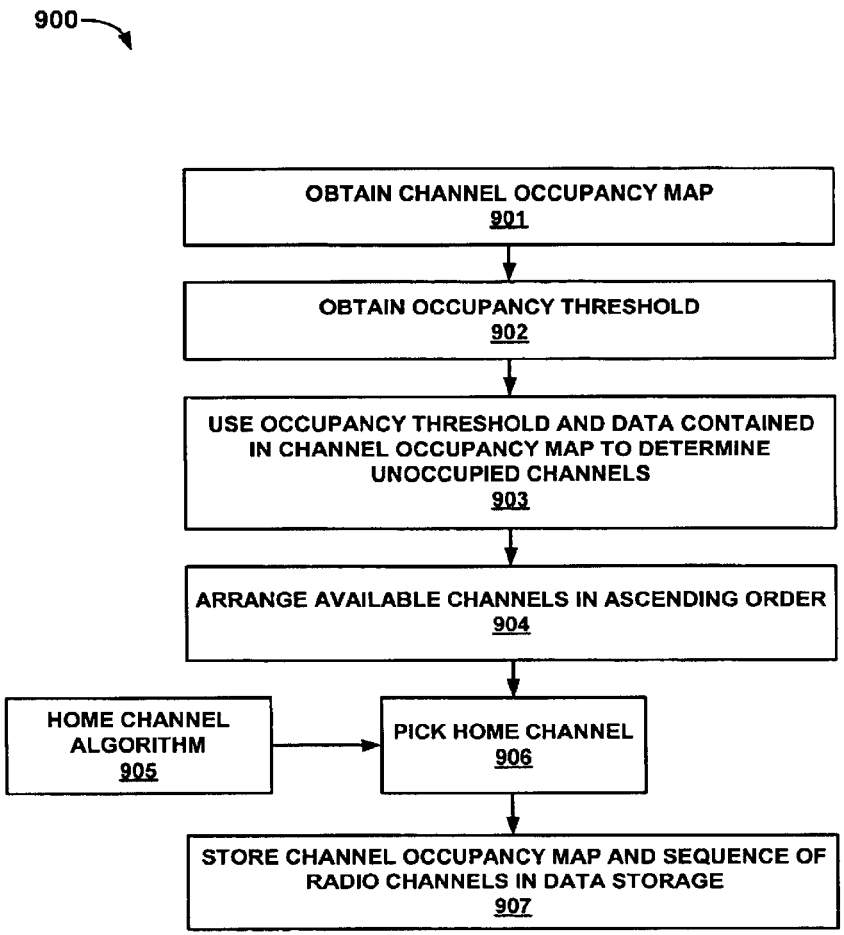
FIG. 9 is a diagram illustrating an exemplary channel selection process using a channel selection algorithm in accordance with one embodiment of the present claimed invention.

FIG. 9 shows flow chart 900 for selecting a sequence of unoccupied radio channels in accordance with one embodiment of the present invention. As shown by step 901 a channel occupancy map is obtained. In one embodiment, the channel occupancy map is obtained by retrieving, from memory storage, the data representing the channel occupancy map.

Continuing with FIG. 9, as shown by step 902, an occupancy threshold is obtained. In one embodiment, when an occupancy threshold is input as a channel preference factor in step 501 of FIG. 8, the occupancy threshold is stored in memory storage. Alternatively, a default channel occupancy threshold that is stored in memory storage is used. In either event, the desired occupancy threshold is obtained.

As shown by step 903, the occupancy threshold is applied to the data in the occupancy map to determine channels that are unoccupied. Then, as shown in step 904, channels that are determined to be unoccupied in step 903 are organized in ascending order. That is, the channels are organized from the lowest channel number to the highest channel number.

Continuing with FIG. 9, a home channel algorithm 905 is used to pick a home channel, as shown by step 906. In one embodiment, the home channel is selected by picking the channel having the lowest channel occupancy in the last measurement period. Alternatively, the home channel is selected by picking the lowest channel number of those channels that are determined to be unoccupied. That is, in one embodiment, the first channel in the sequence of radio channels obtained from step 904 is designated as the home channel.

Continuing with FIG. 9, the channel map is then stored as the "current map" in data storage and the sequence of radio channels obtained from step 904 is then stored in memory storage as shown by step 907. In one embodiment, the sequence of radio channels obtained from step 904 is stored in a storage registers designated as "TEMP STORAGE."

A determination, of channel occupancy and assignment of a radio channel or sequence of radio channels can be performed using any of a number of different methods. In one embodiment, a channel selection algorithm is utilized that uses channel exclusion. That is, once it is determined that a particular channel is occupied, that channel is excluded from the selection process for a predetermined time interval. In one embodiment, the channel selection algorithm excludes channels on which voice usage is detected for a time period of 5 to 20 seconds. This avoids transmission interruptions from voice users in congested areas, particularly when the same channel is used by multiple voice users.

In yet another embodiment (not shown), the channel selection algorithm determines channel occupancy based on the following factors: local repeater frequencies; regulatory regions; received signal strength indicators of voice transmissions; squelch outputs and squelch levels of voice transmissions; and statistical measures of signal (or noise) measurements.

In one embodiment, predicted channel occupancy is used for assigning a radio channel or sequence of radio channels. Predicted occupancy indicates, in percentage terms, the; likelihood of voice transmission being initiated either prior to or during the subsequent message transmission. Radio channels are assigned that are determined not to be occupied and that have a low predicted channel occupancy.

In one embodiment, a probability density model is constructed by scanning all the channels and assigning a predicted occupancy for each channel for 1-second, 5-second, and 10-second time periods. This gives an indication as to whether each channel will be occupied during the subsequent transmission that corresponds to the current channel assignment.

One simple method for determining a predicted occupancy for each channel uses the compliment of occupancy as an indication of predicted occupancy. In this embodiment, the percentage occupancy is determined for each channel during the period that the channel is monitored. The percentage occupancy is subtracted from one to obtain the compliment. Channels are then chosen that have a compliment that is less than or equal to a predicted occupancy threshold. In one embodiment, a predicted occupancy threshold of 0.5 is used. FIG. 11 shows an example in which ten channels are scanned, shown in row 1101 as channels 1–10. In this example, occupancy of each channel is shown as a percentage in row 1102. Row 1103 shows the corresponding compliment for each of channels 1–10. When a predicted occupancy threshold of 0.5 is used, only channels 1–3, 5, 7, and 10 can be chosen as assigned channels as is shown in row 1104.

In one embodiment, a predetermined maximum consecutive assignment value is used in conjunction with predicted occupancy for channel assignment. The number of times that a particular channel is consecutively assigned is determined and is compared with the maximum consecutive assignment value. When the number of times that a particular channel is consecutively assigned equals the maximum consecutive assignment value, the particular channel is not assigned. Rather, the next sequential channel that is indicated by the probability density model is assigned. This keeps the method and apparatus of the present invention moving from channel to channel, preventing excessive use of any particular channel.

In an alternate embodiment, channel occupancy maps are saved and used during subsequent periods for facilitating channel assignments. In one embodiment, if an evaluation of prior channel occupancy maps determines that the voice occupancy does not change much in a given area over a given time period, a hopping sequence is created for that time period and is used during each subsequent time period. The time period used may be, for example, daily, or hourly. The created hopping sequence is then perfected using a statistical usage model. For example, if voice usage picks up each afternoon on one or more channels, the hopping sequence is modified using the statistical usage model. The modified hopping sequence can then be used in subsequent time periods. In one embodiment, the method and apparatus of the present invention generates a daily statistical usage model on the first day of use in a particular area. This daily statistical usage model is then used for generating hopping sequences for subsequent days, and is perfected by updates to the statistical usage model during the entire time that the first communication device is used in a particular location.

Figure 12:
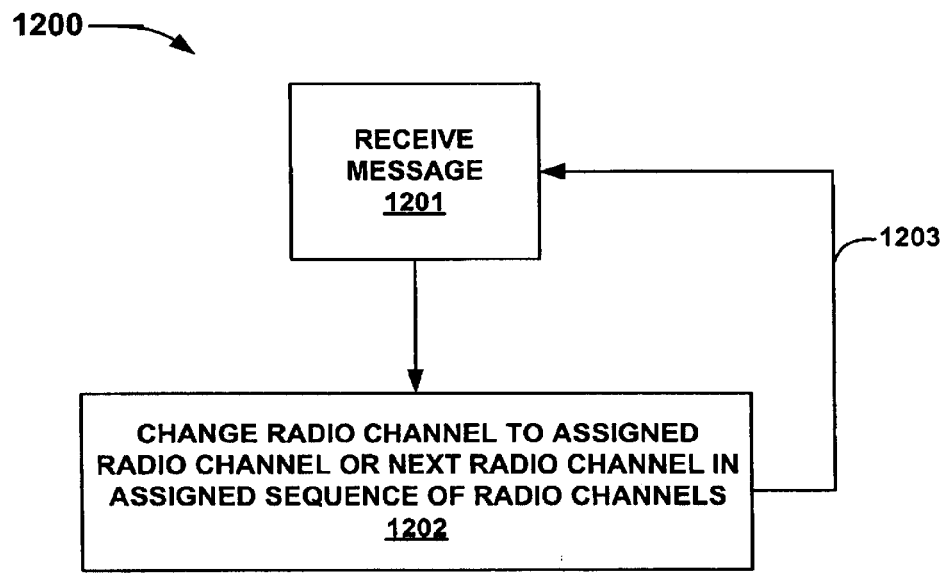
FIG. 12 is a flow chart showing a method for coupling data from a first communication device to a second communication device that shows the steps performed by the receiving communication device in accordance with one embodiment of the present claimed invention.

As shown by flow chart 1200 of FIG. 12, the receiving communication device receives each message as shown by step 1201. In the embodiment shown in FIG. 2, communication device 2 is the receiving communication device.

As shown by step 1202, after each message is received, the receiving communication device changes the radio channel to the assigned radio channel or the next radio channel in the sequence of radio channels. That is, when a transmitting communication device indicates a single assigned radio channel as shown in the embodiments of FIGS. 5 and 7, the receiving communication device changes the radio channel to the assigned radio channel. When the transmitting communication device indicates a assigned sequence of radio channels, the receiving communication device changes the radio channel to the next radio channel in the assigned sequence of radio channels. This process is repeated as shown by line 1203, resulting in the receiving communication device following the movement of the transmitting communication device by moving from channel to channel to receive subsequent messages.

In one embodiment, communication device 2 of FIG. 2 transmits a signal that confirms the receipt of each message. This confirmation signal is received by communication device 1 and is used to assure that communication device 2 is properly following communication device 1 as it hops from channel to channel. In an embodiment in which the listen before transmit feature is used such as is shown in FIGS. 6 and 8, when a message has not been received in a predetermined amount of time, the receiving communication device automatically moves to the next channel in the sequence of radio channels. This corresponds to a response of "no" in step 604 of FIGS. 6 and 8 and results in the receiving communication device continuing to follow the channel changes of the sending communication device.

For further support, Appendix A is included herein. Appendix A includes all of the material of the parent application and is intended to be a part of the present application.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for coupling a message by radio from a first communication device comprising:
   a) monitoring, at a first communication device, radio transmissions over a plurality of radio channels;
   b) generating a channel occupancy map comprising a plurality of epochs;
   c) applying a channel selection algorithm to said channel occupancy map for selecting an unoccupied radio channel for assignment;
   d) assigning said radio channel that is unoccupied;
   e) generating a message at said first communications device, said message indicating said assigned radio channel;
   f) transmitting said message over a radio channel;
   g) changing said radio channel to said assigned radio channel; and
   h) repeating steps a) through g) such that subsequent messages are transmitted over unoccupied radio channels.

2. A method for coupling a message by radio from a first communication device as recited in claim 1, further including inputting channel preference factors and applying said channel preference factors and said channel selection algorithm to said channel occupancy map for selecting an unoccupied radio channel for assignment.

3. A method for coupling a message by radio from a first communication device as recited in claim 1, wherein said channel selection algorithm uses the complement of the percentage occupancy of each radio channel for assigning a radio channel.

4. A method for coupling a message by radio from a first communication device as recited in claim 1 further comprising excluding those channels over which a transmission is detected from the selection process for a predetermined amount of time.

5. A method for coupling a message by radio from a first communication device as recited in claim 1 wherein said channel selection algorithm uses predicted occupancy for assigning a radio channel.

6. A method for coupling a message by radio from a first communication device as recited in claim 1 wherein said channel selection algorithm determines the number of consecutive assignments for an assigned channel and assigns a different channel when the number of consecutive assignments has reached a predetermined threshold.

7. A method for coupling a message by radio from a first communication device as recited in claim 1 wherein steps a) through e) are performed during the performance of step f).

8. A method for coupling a message by radio from a first communication device as recited in claim 1 wherein step f) is performed after the performance of step e).

9. A method for coupling a message by radio from a first communication device comprising:
   a) monitoring, at a first communication device, radio transmissions over a plurality of radio channels;
   b) generating a channel occupancy map comprising a plurality of epochs;
   c) applying a channel selection algorithm to said channel occupancy map for determining a sequence of unoccupied radio channel for assignment;
   d) assigning said sequence of radio channels that are unoccupied;
   e) generating a message at said first communication device, said message indicating said assigned sequence of radio channels;
   f) transmitting said message over a radio channel;
   g) changing said radio channel to the next radio channel in said assigned sequence of radio channels; and
   h) repeating steps a) through g) such that subsequent messages are transmitted over unoccupied radio channels.

10. A method for coupling a message by radio from a first communication device as recited in claim 9, further including inputting channel preference factors and applying said channel preference factors along with said channel selection algorithm to said channel occupancy map for determining a sequence of unoccupied radio channel for assignment.

11. A method for coupling a message by radio from a first communication device as recited in claim 9 wherein said channel selection algorithm uses the complement of the percentage occupancy of each radio channel for assigning said sequence of radio channels.

12. A method for coupling a message by radio from a first communication device as recited in claim 9 wherein step b) further includes: excluding those channels over which a transmission is detected from the selection process for a predetermined amount of time.

13. A method for coupling a message by radio from a first communication device as recited in claim 9 wherein said channel selection algorithm uses predicted occupancy for assigning a sequence of radio channels.

14. A method for coupling a message by radio from a first communication device as recited in claim 9 wherein steps a) through e) are performed during the performance of step f).

15. A method for coupling a message by radio from a first communication device as recited in claim 9 wherein step f) is performed after the performance of step e).

16. A method for coupling a message by radio from a first communication device to a second communication device comprising:
   a) monitoring, at a first communication device, radio transmissions over a plurality of radio channels;
   b) generating a channel occupancy map comprising a plurality of epochs;
   c) applying a channel selection algorithm to said channel occupancy map for selecting an unoccupied radio channel for assignment;
   d) assigning said radio channel that is unoccupied;
   e) generating a message at said first communication device, said message indicating said assigned radio channel;
   f) transmitting said message from said first communication device over a radio channel;
   g) changing said radio channel of said first communication device to said assigned radio channel;
   h) receiving said message at a second communication device; and
   i) changing the radio channel of said second communications device to said assigned radio channel; and
   j) repeating steps a) through i) such that messages are coupled from said first communication device to said second communication device over unoccupied radio channels.

17. A method for coupling a message by radio from a first communication device to a second communication device comprising:
   a) monitoring, at a first communication device, radio transmissions over a plurality of radio channels;
   b) generating a channel occupancy map comprising a plurality of epochs;
   c) applying a channel selection algorithm to said channel occupancy map for determining a sequence of unoccupied radio channel for assignment;
   d) assigning said sequence of radio channels that are unoccupied;
   e) generating a message at said first communication device, said message indicating said assigned sequence of radio channels;
   f) transmitting said message from said first communication device over a radio channel;
   g) changing said radio channel of said first communication device to the next channel in said assigned sequence of radio channels;
   h) receiving said message at a second communication device; and
   i) changing the radio channel of said second communications device to the next channel in said assigned sequence of radio channels; and
   j) repeating steps a) through i) such that messages are coupled from said first communication device to said second communication device over unoccupied radio channels.

* * * * *